United States Patent [19]

Berryman et al.

[11] Patent Number: 5,325,918

[45] Date of Patent: Jul. 5, 1994

[54] OPTIMAL JOULE HEATING OF THE SUBSURFACE

[75] Inventors: James G. Berryman, Danville; William D. Daily, Livermore, both of Calif.

[73] Assignee: The United States of America as represented by the United States Department of Energy, Washington, D.C.

[21] Appl. No.: 100,800

[22] Filed: Aug. 2, 1993

[51] Int. Cl.$^5$ .................. E21B 36/04; E21B 43/22; E21B 43/24; G01V 3/04

[52] U.S. Cl. .................. 166/248; 166/302; 166/246; 166/250; 219/419

[58] Field of Search ............ 166/248, 302, 272, 246, 166/250; 219/415–419; 392/301, 306; 324/348, 358

[56] References Cited

U.S. PATENT DOCUMENTS

| | | | |
|---|---|---|---|
| 2,162,086 | 6/1939 | Jakowsky | 324/358 |
| 2,189,377 | 2/1940 | Heiland | 324/358 |
| 2,345,608 | 4/1944 | Lee | 324/358 |
| 2,922,101 | 1/1960 | Mayes | 324/358 |
| 3,848,671 | 11/1974 | Kern | 166/248 |
| 3,948,319 | 4/1976 | Pritchett | 166/248 |
| 4,134,683 | 1/1979 | Goetz et al. | 250/356 |
| 4,228,853 | 10/1980 | Harvey et al. | 166/248 |
| 4,577,153 | 3/1986 | Stolarczyk | 324/334 |
| 4,679,626 | 7/1987 | Perkins | 166/248 |
| 4,722,220 | 2/1988 | Herron | 73/250 |
| 4,742,305 | 5/1988 | Stolarczyk | 324/334 |
| 5,065,100 | 11/1991 | Vail, III | 324/339 |

FOREIGN PATENT DOCUMENTS

| | | |
|---|---|---|
| 744342 | 12/1974 | U.S.S.R. |
| 1062631A | 9/1982 | U.S.S.R. |
| 1223180A | 1/1983 | U.S.S.R. |

OTHER PUBLICATIONS

T. J. Yorkey et al, "Comparing Reconstruction Algorithms for Electrical Impedance Tomography", IEEE Transactions on Biomedical Engineering, vol. BME-34, No. 11, Nov. 1987.

W. Daily, et al., "Hyrdological Properties of Topopah Spring Tuff: Laboratory Measurements", J. of Geophysical Research, vol. 92, No. B8, pp. 7854–7864, Jul. 10, 1987.

K. A. Dines et al., "Analysis of Electrical Conductivity Imaging", Geophysics, vol. 46, No. 7, pp. 1025–1036, Jul. 1981.

J. G. Berryman, "Convexity Properties of Inverse Problems with Variational Constraints" J. of the Franklin Institute, vol. 328, No. 1 pp. 1–13, 1991.

James G. Berryman et al., "Variational Constraints for Electrical-Impedance Tomography", Physical Review Letters, vol. 65, No. 3, pp. 325–328, Jul. 16, 1990.

W. Daily, et al., "Cross-borehole resistivity tomography", Geophysics, vol. 56, No. 8, pp. 1228–1235, Aug. 1991.

Primary Examiner—Stephen J. Novosad
Attorney, Agent, or Firm—Henry P. Sartorio; Roger S. Gaither; William R. Moser

[57] ABSTRACT

A method for simultaneously heating the subsurface and imaging the effects of the heating. This method combines the use of tomographic imaging (electrical resistance tomography or ERT) to image electrical resistivity distribution underground, with joule heating by electrical currents injected in the ground. A potential distribution is established on a series of buried electrodes resulting in energy deposition underground which is a function of the resistivity and injection current density. Measurement of the voltages and currents also permits a tomographic reconstruction of the resistivity distribution. Using this tomographic information, the current injection pattern on the driving electrodes can be adjusted to change the current density distribution and thus optimize the heating. As the heating changes conditions, the applied current pattern can be repeatedly adjusted (based on updated resistivity tomographs) to affect real time control of the heating.

10 Claims, No Drawings

OPTIMAL JOULE HEATING OF THE SUBSURFACE

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the heating of the underground by ohmic dissipation of energy as current flows through the ground. More specifically, it relates to a method using electrical resistance tomography to adjust the distribution of energy deposition so that heating of a region underground is controlled by depositing energy in a predetermined pattern.

2. Description of Related Art

Many applications require heating of regions underground. For example, heat can be used to: (1) reduce the viscosity of heavy oil deposits so they can flow to a wellbore and be pumped to the surface; (2) vaporize contaminants in the soil so they can be collected in wells or the surface and removed from the ground; and (3) enhance the in situ microbial degradation of organic pollutants such as volatile organic compounds (VOC). For example, the growth and metabolic rates of many naturally occurring microorganisms double with each 5 to 10 degree Celsius increase in temperature between 20 and 45 degrees Celsius. Electric heating might therefore reduce the time required for microbial in situ remediation more than an order of magnitude with a possible commensurate cost savings. Also, temperature optimization generally results in more complete metabolic degradation, yielding lower residual pollution concentrations.

Joule heating of highly viscous oils to reduce viscosity and enable recovery of these resources is already being practiced in industry. The use of imaging techniques such as seismic tomography and nuclear magnetic resonance are also being developed by other groups. Any practical method to control the power dissipation pattern in the ground must start with information about the resistivity distribution in the region to be heated. To obtain this information requires an imaging method that is designed specifically for resistivity. Methods such as seismic tomography are not candidates. Seismic tomography images mechanical properties such as sound wave speed. A method that images the resistivity distribution itself is clearly to be preferred. Such a method is electrical resistance tomography. Electrical resistivity tomography (ERT) uses electric currents to image the region which is also being heated by electric currents.

Two problems exist with traditional subsurface heating methods such as hot air or steam injection. First, it is difficult to determine where heat is being deposited. Second, there is little or no control over where the heat is deposited. The proposed method is a new and novel approach to optimized heating-monitoring of the subsurface. Because of its unique capabilities, various underground processes would be practical which before were not: (1) heating heavy oil formations, (2) enhancing production of a depleted oil formation, (3) enhancing microbial metabolism of hydrocarbons and (4) volatilization of volatile organic compounds (VOC's) at a hazardous waste site.

Several methods have been used to heat the subsurface. These include injecting into the ground hot water, hot air, steam, electric current and even radio waves. Each approach has unique features. However, they all have in common that it is difficult to determine or control what is heated. For example, when a fluid such as steam is injected, it establishes a channel along the path of greatest fluid permeability, the most highly conducting route between the injection and extraction points. The more steam that flows along this path the higher the fluid permeability becomes and the lower the resistance to flow. Heat can be deposited along that path. However, there is no good method to determine the location of that path. Even more difficult, there is no way to change that path. Usually it is desirable to heat more than the zone chosen by nature. A way is needed to determine where heat is being deposited, and just as importantly, to change it at will. The present invention provides such a method.

SUMMARY OF THE INVENTION

It is an object of the present invention to provide a method for optimized joule heating of the subsurface using electrical resistance tomography.

A method is provided for simultaneously heating the subsurface and imaging the effects of the heating. This method combines the use of tomographic imaging (electrical resistance tomography or ERT) to image electrical resistivity distribution underground, while joule heating is accomplished by electrical currents injected in the ground. For joule heating, a voltage distribution is established on a series of buried or surface electrodes resulting in energy deposition underground that is a function of the resistivity and current density. Measurement of the separate voltages and currents on the heating electrodes or on other electrodes also permits a tomographic reconstruction of the resistivity distribution. Using this tomographic information, the current injection pattern on the heating electrodes can be adjusted to change the current density distribution and thus optimize the heating. Various trial patterns of current injection can be tested by computer simulation based on the known resistivity distribution, and the best injection pattern can then be used in the field. As the heating changes conditions, the applied current pattern can be repeatedly adjusted (based on updated resistivity tomographs and simulations) to affect real time control of the heating.

DETAILED DESCRIPTION OF THE INVENTION

The preferred embodiment of the present invention is a method for heating of the underground by ohmic dissipation of energy as current flows through the ground. The distribution of energy deposited in the ground is described by the product of the resistivity and the square of the current density. To control the distribution of energy, the resistivity distribution $\rho(x)$ must be known. Once this is known, the current distribution in the volume $j(x)$ can be controlled by placement of electrodes and choosing the appropriate impressed voltage at the surface of the volume. Therefore, a method is needed to map the resistivity distribution in the region of interest quickly and inexpensively. Present technology of ERT exists which will accomplish this (Yorkey, T. J., "Comparing Reconstruction Methods for Electrical Impedance Tomography", Ph.D. Thesis, Dept. of Elect. Comp. Eng., Univ. of Wisconsin, Madison, Wis. 53706, August 1986.). In the preferred embodiment of the present invention, the same electrodes used for heating are used for ERT imaging, although separate electrodes for heating and imaging could also be used. Once the resistivity distribution is known, the desired voltage distribution can be calculated. Then the electrodes are driven with currents that produce that potential distribution to heat the subsurface. The process of heating will alter the resistivity distribution. Therefore, ERT is used periodically to update the resistivity distribution information, which in turn is used to update the voltage distribution for a new current distribution. This iterative procedure is an important part of the process.

Electrical heating of the subsurface naturally fits with electrical tomography for monitoring the process. Electrical heating is unique in the flexibility it provides for adjusting the rate and distribution of heat deposition in a volume simply by controlling the injection current distribution applied at the boundary of the volume. This allows for highly controlled and tailored heating of the subsurface.

Electrical resistance tomography (ERT) is a technique to reconstruct the distribution of resistivity inside a body from measurements of currents and voltages on its boundary. The method may be applied either to planar (two-dimensional) or to volumetric (three-dimensional) imaging. Using a core sample to provide a two-dimensional example, a series of electrodes may be evenly spaced azimuthally around the core (W. D. Daily et al., "Hydrological Properties of Topopah Spring Tuff—Laboratory Measurements," *J. Geophysical Res.*, Vol. 92, pp.7854–7864, 1987). Two adjacent electrodes are driven by a known current. The voltage difference between all other adjacent pairs of electrodes is measured. Transfer resistance is the ratio of measured voltage to injected current. Then, the current is applied to two other adjacent electrodes and the voltage again measured between all other adjacent electrodes. This process is repeated until current has been applied to all pairs of adjacent electrodes. For n electrodes there will be $n(n-3)/2$ independent transfer resistances. This procedure is very similar to that used for dipole-dipole resistivity surveys. However, tomographic interpretation of these data is quite different from the traditional approaches.

One major difficulty with impedance imaging is in the reconstruction algorithm. It is necessarily much different from the algorithm used in x-ray tomography. In computerized tomography (CT) the x-rays, which are used for probing, travel in image-independent straight-line paths. With ERT, the currents tend to flow along the paths of least resistance, and therefore are image (resistivity) dependent. This image dependency makes ERT a nonlinear reconstruction problem. The algorithm for CT depends on relatively simple backprojection along the straight rays to deduce the attenuation coefficients giving rise to exponential decay of the x-rays along their paths. By contrast, impedance imaging requires the inversion of current and potential data using a fundamentally different approach.

The mathematical problem to be solved is Poisson's equation in the region of interest $$-\nabla \cdot (\sigma \nabla \phi) = 0 \qquad (1)$$

where $\nabla$ is the gradient operator and $\nabla \cdot$ is the divergence operator, $\sigma$ is the conductivity, $\phi$ is the electrical potential, and the solution to the equation is subject to Neumann boundary conditions on the surface $$\sigma(s)\eta \cdot \nabla \phi = j(s) \qquad (2)$$

where $\eta$ is the unit outward normal vector. Equation (2) states that at active electrode sites, the surface current density is given by j(s), where j represents an impressed current source distribution on the boundary of the body of interest. Now, given multiple sets of measurements of $\phi$ and j, it is necessary to estimate the spatial variation of the conductivity $\sigma$. This mathematical problem has been studied by many people, for example, Dines and Lytle (K. A. Dines et al., "Analysis of Electrical Conductivity Imaging", *Geophysics*, Vol. 46, pp. 1025–1026, 1981) used circuit analysis to generate estimates of the conductivity using an iterative process on network equations that are linearized in the unknown conductance variables. Although this approach is successful in some situations, convergence can be quite slow. Also, there is no guarantee of convergence if the initial guess of the conductivity distribution is so inaccurate that the required linearization provides poor estimates of succeeding increments in the local conductivity. In addition to this early work, many have tried other approaches with varying degrees of success(e.g., R. Henderson et al., "An Impedance Camera for Spatially Specific Measurements of the Thorax", *IEEE Trans. Biomech. Eng. BME*, Vol. 25, pp. 250–254, 1978). Yorkey (1986), supra, has developed a finite element algorithm and has shown it to be superior to the previous algorithms in the cases studied.

Inversion schemes often require linearization of the governing equations and this process tends to make them unstable, especially in the presence of data noise. A fundamentally new approach to stabilizing the inversion algorithms has recently been developed (see J. G. Berryman, "Convexity Properties of Inverse Problems with Variational Constraints", *J. Franklin Inst.*, Vol. 328, pp. 1–13, 1991). This approach constrains the solution to lie in the physically realizable regions of the model space—thus the constraints are called feasibility constraints, for example, to invert electrical boundary measurements to obtain the interior conductivity distribution of a body. Then the set of powers (voltage times current dissipated while current is injected between pairs i of electrodes $\{P_i\}$) is the pertinent data set to define a feasibility boundary in the model space. The variational formulation (Dirichlet's principle) states that $$p_i(\sigma) = \min_{\phi_i^{(trial)}} \int \sigma |\nabla \phi_i^{(trial)}|^2 d^3x = \int \sigma |\nabla \phi_i^*[\sigma]|^2 d^3x$$

where $\phi_i^{(trial)}(x)$ is the trial potential field for the i-th injection pair and $\phi_i^*[\sigma](x)$ is the potential field distribution that actually minimizes the power dissipation for conductivity distribution $\sigma(x)$. A trial power dissipation is defined by $$p_i^{(\phi_i)}(\sigma) = \int \sigma |\nabla \phi_i^{(trial)}|^2 d^3x$$

Then, the correspondence between first arrival traveltime inversion and electrical impedance tomography is:

$s \to \sigma$
$t_i(s) \to p_i(\sigma)$
$T_i^{(pi)}(s) \to p^{(\phi i)}(\sigma)$
$dl_i^{(path)} \to |\nabla \phi_i^{(trial)}|^2 d^3x$
$dl_i^*[s] \to |\nabla \phi_i^*[s]| d^3x$
$T_i \to P_i$ All the concepts of feasibility constraints and feasible sets carry over immediately since $$P_i = p_i(\sigma_o) \leq p_i(\sigma_o)$$

must be true if $s_o$ is a solution of the inverse problem.

The variational constraints may be used in a variety of different ways. The common methods of obtaining the data and inverting for the conductivity distribution do not make use of the power dissipated at all. In fact, it is generally agreed that the power is difficult to measure accurately across the injection electrodes in this method. However, measurements can certainly be done. Furthermore, for some methods of using the feasibility constraints to do inversion in this problem, it is not necessary that highly accurate measurements of power be made.

There are two main approaches to using power dissipation in the inversion of electrical resistance tomography data: (1) The electrical power dissipated across the current injection electrodes is the only data available. (2) The electrical power dissipated across the current injection electrodes is used together with standard measurements of voltage differences across other electrodes on the surface of the volume.

If the only data available is electrical power dissipated across the current injection electrodes, then because of the one-to-one mapping between the traveltime inversion problem and the electrical resistance tomography, an inversion algorithm for electrical resistance tomography can be designed to follow the steps of the traveltime tomography algorithm exactly. Only the names and physical significance of the parameters in the algorithm change, while all the steps are identical.

On the other hand, if the electrical power dissipated is used in conjunction with the transfer resistance data (i.e., the voltage differences across other electrodes as a function of the input current), then the algorithm can take a number of different forms. The key point is that in any iterative algorithm there is a step where the correction is made to the model to be reconstructed, thus producing the updated model. At this stage of the algorithm, a determination may be made whether a relaxation parameter should be introduced (i.e., whether the full correction should be made or some fraction of it or even more that the computed correction). The relaxation parameter is generally a scalar quantity and for underrelaxation it is a number between zero and one. The choice of the magnitude of such a relaxation parameter is a natural one to be made in light of the feasibility constraints. The reason is as before: the correction step is nearly always made based on some linear programming ideas such as a least squares fit to the data. By using the feasibility constraints to determine the relaxation parameter, the nonlinearity of the true inversion problem is injected into the algorithm at this stage while still taking advantage of the computational economies inherent in the linear programming techniques. This small adjustment to the standard procedures can lead to dramatic improvements in performance because of the stability introduced by insisting that the solution remain close to the feasibility boundary. The method is therefore robust against measurement errors and computational (round-off) errors as well.

In principle, joule heating is very simple. Electrical currents tend to heat the materials through which they flow so joule heating of the earth will tend to warm the region between the injection electrodes. However, gaining fine control over this process requires information about the region being warmed. All materials that conduct electricity (except superconductors) have a finite resistivity associated with them. Ohm's Law states that the voltage drop across a resistor is proportional to the current flowing through it, and the constant of proportionality is the resistance. Similarly, when current is injected into the ground, that current spreads out from the injection point forming a current distribution in the surrounding region. The voltage drop across the injection electrodes is again proportional to the current distribution and the proportionality depends on the distribution of resistivity throughout the region. The power dissipated in a lumped system (a resistor) is just the resistance times the square of the current. The power dissipated in a distributed system is the total power lost in the local resistances and is found by integrating the resistivity times the square of the current distribution over the volume $$P = \int j^2 \rho dv \qquad (3)$$

where P is the power dissipation, j is the current density, and $\rho$ is the resistivity. Although the magnitude of the total current being injected at the electrodes is generally known, j(x) is generally unknown, i.e., how this current is distributed throughout the region being heated. Furthermore, certain well known rules (such as the fact that the current tends to take the path of least resistance or that the current distribution will tend to minimize the overall power dissipation) suggest that controlled regional heating with electrical currents will not be simple.

During the course of the finite difference modeling for the ERT inversion routine, it is straightforward to compute both the total power dissipation in the entire region and the local power dissipation in any target subregion of interest. Thus, the imaging method provides a simulation tool containing exactly the information needed to determine the actual pattern of the power dissipation. Furthermore, once the reconstructed resistivity distribution is available, it is straightforward to do other simulations of various potential distributions which will result in a new heating pattern, using $$\nabla \cdot \rho^{-1} \nabla \phi = 0$$

where $\phi$ is the potential in the volume.

The process of heating will alter the resistivity distribution since the resistivity of soil and rock is a function of temperature and this will change as electrical energy is dissipated and heat is deposited in the medium. For saturated soils the resistivity depends exponentially on inverse temperature (Keller, G. V., Electrical Properties of Rocks and Minerals, CRC Handbook of Physical Properties of Rocks, R. S. Carmichael, ed., CRC Press, Boca Raton, Fla., 1982.). Therefore, ERT would be used periodically to update the resistivity distribution information, which in turn is used to update the voltage distribution for a new optimal current distribution. This iterative or updating procedure is an important part of the process since present technology for joule heating underground often fails when the heating establishes conditions which channel the current and concentrate the energy deposition in undesirable areas. Present practice has no way of knowing when this happens or how to correct it. This method allows for both the determination of changes in current flow (using ERT imaging of resistivity) and the adjusting of electrical current density and therefore energy (or heat) deposition (by changing injection current and voltage distribution).

Consider the simple case where the resistivity is constant and the region of interest is circular. If the voltage on the boundary is $V = V_o \sin a$, where a is the azimuthal angle around the boundary, then the electric field and the current density are both uniform in the region. As described by Equation 3 the power dissipation would be uniform in the region. Of course, impressing the voltage with only a finite number of electrodes arranged around the region would allow only an approximately sinusoidal distribution and therefore only an approximately uniform internal field.

Now consider the case where the resistivity is constant and the region of interest is circular. Now, however, the voltage is applied to only two adjacent electrodes and the current distribution is not uniform but is concentrated between the electrodes as an electric dipole. The power dissipation is not uniform in the region but is proportional to the square of the current density so it is also concentrated at the edge of the region between the electrodes. Many different configurations are possible; these two examples just illustrate the type of control that is possible. The objective would be development of algorithms to handle more general resistivity distributions and heating requirements.

The preferred embodiment of the present invention is a method of optimal joule heating of the subsurface comprising:

(a) measuring a potential distribution V(1) in a subsurface volume of interest, on measuring electrodes, using electrical resistance tomography (ERT);

(b) inverting said potential distribution to obtain a first map of electrical resistivity $\rho(1)$ in said subsurface volume of interest;

(c) calculating a desired current distribution j (1) from said V(1) and said $\rho(1)$;

(d) injecting said j (1) into said subsurface volume of interest;

(e) calculating power dissipated in said subsurface volume of interest by integrating the resistivity times the square of the current distribution over the volume $$P = \int j^2 \rho dv$$

where P is the power dissipation, j is the current density j (1), and $\rho$ is the resistivity;

(f) measuring a potential distribution V(2) in said subsurface volume of interest, on measuring electrodes, using electrical resistance tomography (ERT);

(g) inverting said potential distribution V(2) to obtain a second map of electrical resistivity $\rho(2)$ in said subsurface volume of interest;

(h) calculating an optimal current distribution j(2) from said V(2) and said $\rho(2)$;

(i) injecting said j (2) into said subsurface volume of interest;

(j) calculating power dissipated in said subsurface volume of interest by integrating the resistivity times the square of the current distribution over the volume $$P = \int j^2 \rho dv$$

where P is the power dissipation, j is the current density j (2), and $\rho$ is the resistivity $\rho(2)$; and (k) repeating steps (f) through (j) until a desired temperature is achieved in said subsurface.

Another embodiment of the present invention is a method of optimal joule heating of the subsurface comprising the following steps:

1. First the resistivity distribution $\rho(1)$ in the region is determined using ERT. From a series of electrodes, various combinations of transmitters and receivers are used to measure four electrode transfer resistances as described by Daily et al., (*Water Resources Research*, 28, 1992).

2. These transfer resistances are inverted using a standard inversion algorithm such as the one described by Daily and Owen (*Geophysics*, Vol. 56, 1991), Yorkey et al. (IEEE *Trans. Biomed. Eng.* BME, Vol. 34, 1987) or Berryman and Kohn (*Phys. Rev. Lett.*, Vol. 65, 1990). The result is a map of the electrical resistivity in the region of interest.

3. Using some assumed current distribution on the heating electrodes, along with the above resistivity distribution, the forward problem is solved which calculates the potential distribution V(s) in the volume.

4. From this potential function the power dissipated is found by integrating the resistivity times the square of the current distribution over the volume $$P = \int j^2 \rho dv$$

where P is the power dissipation, j is the current density, and $\rho$ is the resistivity.

5. The assumed current distribution is adjusted and the calculation repeated until the desired power dissipation function is attained. This may be a uniform distribution or it may be nonuniform. A uniform distribution may be desired for warming of the subsurface to accelerate microbial growth. A nonuniform distribution may be desired for vaporizing contaminants concentrated in a clay rich lens.

6. This injection current is used for heating for a period of time.

7. Where the temperature has increased a few degrees, the resistivity will have decreased because of the increased ion mobility in the pore water and on the surface conduction layer. Then, a new resistivity $\rho'(x)$ is measured as per steps 1 and 2 above.

8. The temperature change $\Delta T(x)$ is estimated from $\Delta \rho(x) = \rho'(x) - \rho(x)$ and an empirical relation between temperature and ground resistivity. The energy actually deposited in the region $\Delta E(x)$ is estimated from $\Delta T(x)$.

9. Then a new energy distribution $E'(x)$ is estimated that would lead toward the desired temperature distribution.

10. For $\rho'(x)$ and $E'(x)$ a new potential $V'(s)$ is calculated and used for heating. The process, beginning with measuring a new resistivity distribution, is repeated after each heating episode; each iteration tending to drive the temperature toward the desired distribution of heat deposition.

Changes and modifications in the specifically described embodiments can be carried out without departing from the scope of the invention, which is intended to be limited by the scope of the appended claims.

We claim:

1. A method for optimized joule heating of the subsurface comprising:
   (a) imaging a first resistivity distribution of an underground area using electrical resistance tomography (ERT);
   (b) joule heating said underground area with optimally directed currents;
   (c) imaging a second resistivity distribution of said underground area using ERT, to show changes in regional resistivity caused by said joule heating;
   (d) adjusting said joule heating based on the imaged effects; and
   (e) repeating steps (a) through (d) until a desired heating effect is achieved.

2. The method of claim 1, wherein the joule heating step is carried out with electrodes implanted in boreholes.

3. The method of claim 1, wherein the joule heating step is carried out with electrodes emplaced on the surface of the ground.

4. The method of claim 1, wherein the joule heating step is carried out with electrodes buried under the surface of the ground.

5. The method of claim 1, wherein the joule heating step is carried out with electrodes implanted in boreholes and emplaced on the surface of the ground.

6. The method of claim 1, wherein the joule heating step is carried out with electrodes implanted in boreholes or emplaced on the surface of the ground.

7. The method of claim 1, wherein the joule heating step is carried out by establishing a current distribution on a series of buried electrodes resulting in an energy deposition underground which is a function of resistivity and current density.

8. A method of optimal joule heating of the subsurface comprising:
   (a) measuring a potential distribution V(1) in a subsurface volume of interest, on measuring electrodes, using electrical resistance tomography (ERT);
   (b) inverting said potential distribution to obtain a first map of electrical resistivity $\rho(1)$ in said subsurface volume of interest;
   (c) calculating a desired current distribution j (1) from said V(1) and said $\rho(1)$;
   (d) injecting said j (1) into said subsurface volume of interest;
   (e) calculating power dissipated in said subsurface volume of interest by integrating the resistivity times the square of the current distribution over the volume $$P = \int j^2 \rho \, dv$$

where P is the power dissipation, j is the current density j (1), and $\rho$ is the resistivity;
   (f) measuring a potential distribution V(2) in said subsurface volume of interest, on measuring electrodes, using electrical resistance tomography (ERT);
   (g) inverting said potential distribution V(2) to obtain a second map of electrical resistivity $\rho(2)$ in said subsurface volume of interest;
   (h) calculating an optimal current distribution j(2) from said V(2) and said $\rho(2)$;
   (i) injecting said j (2) into said subsurface volume of interest;
   (j) calculating power dissipated in said subsurface volume of interest by integrating the resistivity times the square of the current distribution over the volume $$P = \int j^2 \rho \, dv$$

where P is the power dissipation, j is the current density j (2), and $\rho$ is the resistivity $\rho(2)$; and
   (k) repeating steps (f) through (j) until a desired temperature is achieved in said subsurface.

9. The method of claim 8, wherein said ERT is carried out by measuring 4 electrode transfer resistances from a set of electrodes.

10. The method of claim 8, wherein uniform joule heating is accomplished in steps (d) and (i) using multiple current injection electrodes.

* * * * *